US008831088B2

(12) United States Patent
Park et al.

(10) Patent No.: US 8,831,088 B2
(45) Date of Patent: Sep. 9, 2014

(54) IMAGE PROCESSING METHOD AND APPARATUS

(75) Inventors: Young-o Park, Seoul (KR);
Kwan-woong Song, Seongnam-si (KR);
Young-hun Joo, Yongin-si (KR);
Sung-jae Ko, Seoul (KR); Hyung-min Nam, Seoul (KR); Jae-yun Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 677 days.

(21) Appl. No.: 13/037,435

(22) Filed: Mar. 1, 2011

(65) Prior Publication Data

US 2011/0274161 A1 Nov. 10, 2011

(30) Foreign Application Priority Data

May 6, 2010 (KR) ........................ 10-2010-0042506

(51) Int. Cl.
*H04N 7/50* (2006.01)
*H04N 7/68* (2006.01)

(52) U.S. Cl.
USPC ......................................................... 375/240

(58) Field of Classification Search
USPC ......................................................... 375/240
See application file for complete search history.

(56) References Cited

U.S. PATENT DOCUMENTS

| | | | | |
|---|---|---|---|---|
| 5,481,553 A * | 1/1996 | Suzuki et al. | ................. | 714/800 |
| 5,937,097 A * | 8/1999 | Lennon | ......................... | 382/236 |
| 6,061,400 A * | 5/2000 | Pearlstein et al. | ............. | 375/240 |
| 6,104,434 A * | 8/2000 | Nakagawa et al. | ...... | 375/240.16 |
| 6,249,549 B1 * | 6/2001 | Kim | ......................... | 375/240.21 |
| 6,987,587 B2 * | 1/2006 | Sekizawa et al. | .............. | 358/1.9 |
| 7,860,168 B2 * | 12/2010 | Winger | ..................... | 375/240.24 |
| 8,102,914 B2 * | 1/2012 | Takahashi et al. | ........ | 375/240.12 |
| 8,116,376 B2 * | 2/2012 | Boyce et al. | ............ | 375/240.16 |
| 8,315,310 B2 * | 11/2012 | Shi et al. | ................... | 375/240.16 |
| 2006/0088106 A1 * | 4/2006 | Winger | ..................... | 375/240.24 |
| 2006/0146183 A1 * | 7/2006 | Nakagami et al. | .......... | 348/397.1 |
| 2007/0014482 A1 * | 1/2007 | Kim et al. | ...................... | 382/254 |
| 2010/0128995 A1 * | 5/2010 | Drugeon et al. | .............. | 382/238 |
| 2011/0075734 A1 * | 3/2011 | Sakazume | ................. | 375/240.12 |
| 2011/0170608 A1 * | 7/2011 | Shi et al. | ................... | 375/240.24 |
| 2012/0020580 A1 * | 1/2012 | Sasai et al. | ..................... | 382/233 |
| 2012/0147960 A1 * | 6/2012 | Sato | ......................... | 375/240.16 |
| 2012/0236934 A1 * | 9/2012 | Chen et al. | ............... | 375/240.03 |
| 2012/0250768 A1 * | 10/2012 | Sethu et al. | ............. | 375/240.16 |

* cited by examiner

*Primary Examiner* — Sath V Perungavoor
*Assistant Examiner* — Howard D Brown, Jr.
(74) *Attorney, Agent, or Firm* — Sughrue Mion, PLLC

(57) ABSTRACT

Provided are an image processing apparatus and an image processing method. The image processing method includes: obtaining a reference block a having a first resolution and a differential block having the first resolution; transforming a resolution of a prediction block having the first resolution and a resolution of the differential block having the first resolution in order to generate a prediction block having a second resolution and a differential block having the second resolution, the prediction block having the first resolution and the differential block having the first resolution being generated based on a pixel value of the reference block having the first resolution; and synthesizing the generated prediction block having the second resolution and the generated differential block having the second resolution in order to generate a target block having the second resolution.

21 Claims, 13 Drawing Sheets

IMAGE PROCESSING METHOD AND APPARATUS

CROSS-REFERENCE TO RELATED APPLICATION

This application claims priority from Korean Patent Application No. 10-2010-0042506, filed on May 6, 2010 in the Korean Intellectual Property Office, the entire disclosure of which is incorporated herein by reference.

BACKGROUND

1. Field

Methods and apparatuses consistent with example embodiments relate to converting a resolution of a compressed image.

2. Description of the Related Art

When displaying a compressed image through transformation of a resolution, the compressed image is decoded according to decoding formats corresponding to encoding formats defined by different standards. Then, a downsizing process to decrease a resolution of the decoded image or an upsizing process to increase the resolution of the decoded image is carried out according to a resolution of a display device to reproduce the image.

SUMMARY

According to an aspect of an exemplary embodiment, there is provided an image processing method including: obtaining a reference block having a first resolution and a differential block having the first resolution, the referential block being defined based on a difference between the reference block and a target block having the first resolution; transforming a resolution of a prediction block having the first resolution and a resolution of the differential block having the first resolution in order to generate a prediction block having a second resolution and a differential block having the second resolution, the prediction block having the first resolution and the differential block having the first resolution being generated based on a pixel value of the reference block having the first resolution; and synthesizing the generated prediction block having the second resolution and the generated differential block having the second resolution in order to generate a target block having the second resolution.

According to an aspect of another exemplary embodiment, there is provided an image processing method including: obtaining a reference block a having a first resolution and a differential block having the first resolution, the referential block being defined based on a difference between the reference block and a target block having the first resolution; transforming a resolution of a prediction block having the first resolution and a resolution of the differential block having the first resolution in order to generate a prediction block having a second resolution and a differential block having the second resolution, the prediction block having the first resolution and the differential block having the first resolution being generated based on a pixel value of an adjacent area to the reference block having the first resolution; and synthesizing the generated prediction block having the second resolution and the generated differential block having the second resolution in order to generate a target block having the second resolution.

According to an aspect of another exemplary embodiment, there is provided an image processing method including: transforming a magnitude of a motion vector of a target block having a first resolution at a predetermined ratio in order to generate a transformed motion vector; generating a prediction block having a second resolution based on a pixel value of a reference block having the second resolution indicated by the transformed motion vector; transforming a resolution of a differential block having the first resolution in order to generate a differential block having the second resolution, the differential block having the first resolution defined based on a difference between a reference block having the first resolution and the target block having the first resolution; and synthesizing the generated prediction block having the second resolution and the generated differential block having the second resolution in order to generate a target block having the second resolution.

According to an aspect of another exemplary embodiment, there is provided an image processing method including: transforming a magnitude of a motion vector of a target block having a first resolution at a predetermined ratio in order to generate a transformed motion vector; generating a prediction block having a second resolution based on a pixel value of an adjacent area to a reference block having the second resolution indicated by the transformed motion vector; transforming a resolution of a differential block having the first resolution in order to generate a differential block having the second resolution, the differential block having the first resolution defined based on a difference between a reference block having the first resolution and the target block having the first resolution; and synthesizing the generated prediction block having the second resolution and the generated differential block having the second resolution in order to generate a target block having the second resolution.

According to an aspect of another exemplary embodiment, there is provided an image processing apparatus including: a first transformation unit which transforms a differential block having a first resolution into a differential block having a second resolution in order to generate the differential block having the second resolution; a second transformation unit which obtains a prediction block having the first resolution generated based on a pixel value of a reference block having the first resolution and transforms the prediction block into a prediction block having the second resolution in order to generate the prediction block having the second resolution; and a synthesis unit which synthesizes the generated prediction block having the second resolution and the generated differential block having the second resolution in order to generate a target block having the second resolution.

According to an aspect of another exemplary embodiment, there is provided an image processing apparatus including: a motion vector transformation unit which transforms a magnitude of a motion vector of a target block having a first resolution at a predetermined ratio in order to generate a transformed motion vector; a second transformation unit which generates a prediction block having a second resolution based on a pixel value of a reference block having the second resolution indicated by the transformed motion vector; a first transformation unit which transforms a resolution of a differential block having the first resolution in order to generate a differential block having the second resolution, the differential block having the first resolution defined based on a difference between a reference block having the first resolution and the target block having the first resolution; and a synthesis unit which synthesizes the generated prediction block having the second resolution and the generated differential block having the second resolution in order to generate a target block having the second resolution.

BRIEF DESCRIPTION OF THE DRAWINGS

The above and other aspects will become apparent and more readily appreciated from the following detailed description of certain exemplary embodiments, taken in conjunction with the accompanying drawings of which.

DETAILED DESCRIPTION OF EXEMPLARY EMBODIMENTS

Figure 1:
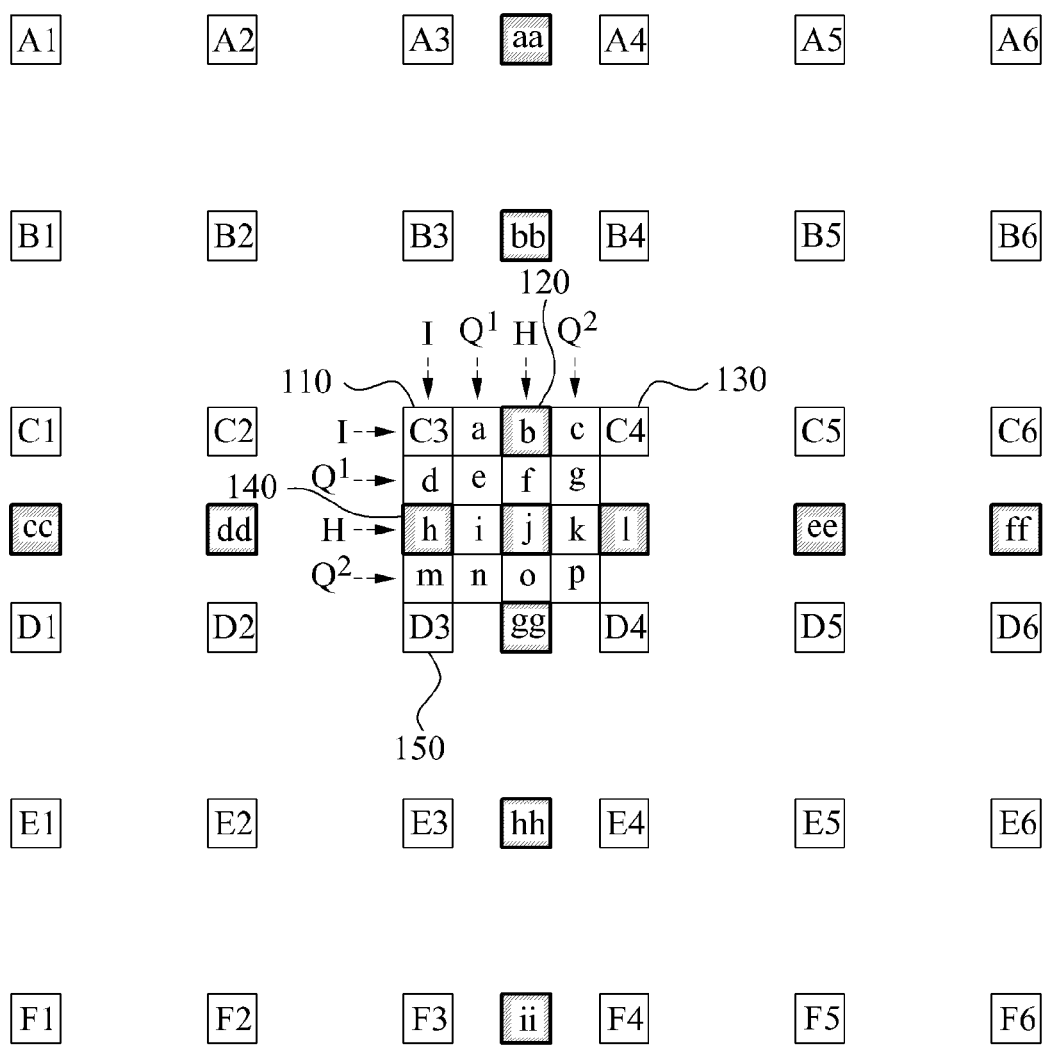
FIG. 1 illustrates an image interpolation process according to a related art.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures. Hereinafter, expressions such as "at least one of," when preceding a list of elements, modify the entire list of elements and do not modify the individual elements of the list.

When decoding a compressed image, inter-prediction or intra-prediction is applicable to each of a plurality of blocks to form one frame according to a compression mode.

Intra-prediction determines a pixel value of a target block using a pixel value of an adjacent block similar to the target block in the frame being decoded. Inter-prediction determines a pixel value of a target block using a motion vector of the target block in a frame being decoded. In further detail, inter-prediction extracts a reference block corresponding to the target block from a reference frame positioned before or after the frame being decoded and generates a prediction block using a pixel value and a motion vector of the reference block. The prediction block is used to determine a pixel value of the target block.

Intra- and inter-prediction may be used to reconstruct an I-frame or a P-frame. Each block in an I-frame may be compressed and reconstructed in one frame according to connection between blocks using the intra-prediction mode. At least one of intra-prediction and inter-prediction may be applied to each block in a P-frame based on properties of the frame. When using an inter-prediction mode, motion compensation may be implemented based on an I-frame or a P-frame in order to reconstruct another P-frame.

Motion compensation implemented in inter-prediction obtains a pixel value for reconstruction from at least one reference frame positioned before or after a frame being coded. Motion compensation may be implemented by an integer pixel unit, or may be implemented by a fractional pixel unit having greater precision than an integer pixel in order to increase accuracy of prediction. For example, motion compensation may be implemented using a pixel value of a ½ pixel (half-pel) and a ¼ pixel (quarter-pel) interpolated using an integer pixel of a reference frame.

FIG. 1 illustrates a process of interpolating an image according to a related art.

In FIG. 1, capital letters represent integer pixels, lowercase letters in grey represent ½ pixels (half-pets), and lowercase letters in white represent ¼ pixels (quarter-pels).

Referring to FIG. 1, a ½ pixel positioned between two adjacent integer pixels in a horizontal direction is generated by applying a 6-tap finite impulse response (FIR) filter horizontally. For example, a ½ pixel b 120 positioned between horizontal integer pixels C3 110 and C4 130 is generated by the following equation $c=(C1-5C2+20C3+20C4-5C5+C6)/32$ by applying the 6-tap FIR filter to six adjacent integer pixels. In the above equation, allocated values 1, −5, 20, 20, −5, and −1 to the six integer pixels adjacent to the interpolated ½ pixel are referred to as a filter coefficient.

Similarly, a ½ pixel positioned between two neighboring integer pixels in a vertical direction is generated by applying the 6-tap finite impulse response (FIR) filter vertically. For example, a ½ pixel h 140 positioned between vertical integer pixels C3 110 and D3 150 is generated by the following equation $c=(A3-5B3+20C3+20D3-5E3+F3)/32$ by applying the 6-tap FIR filter to six adjacent integer pixels. ¼ pixels positioned between two ½ pixels are also calculated by averaging adjacent integer pixels or ½ pixels in a similar manner.

A motion-compensated prediction block is synthesized with a differential block to reconstruct an image with the same resolution as a resolution of an original image. The differential block is an image constituted by a difference value between a reference block located in a reference frame and the original image, and is obtained by performing inverse-quantizing and inverse-transforming of a differential signal obtained from a received bitstream.

A decoded image is provided to a display device supporting a low resolution via a downsizing process to lower a resolution. A downsizing process is implemented by applying a bilinear filter or Wiener filter. A downsizing process may be performed by a process in which pixels used for resolution transformation are located, multiplied by a predetermined value, and summated. When applying a bilinear filter, an average value of two pixels is used to determine a pixel value used for a low resolution. When applying a Wiener filter, a plurality of pixels are multiplied by a filter coefficient obtained using a sync operation and a resolution-transformed pixel and summated, thereby obtaining resolution-transformed pixels.

A resolution transformation process of a compressed image according to related schemes may be performed by a process in which a compressed image is decoded and a resolution of the decoded image is lowered. The resolution transformation process may have an effect on a device having limited resources to decode a compressed image and transform a resolution of the decoded image.

Figure 2:
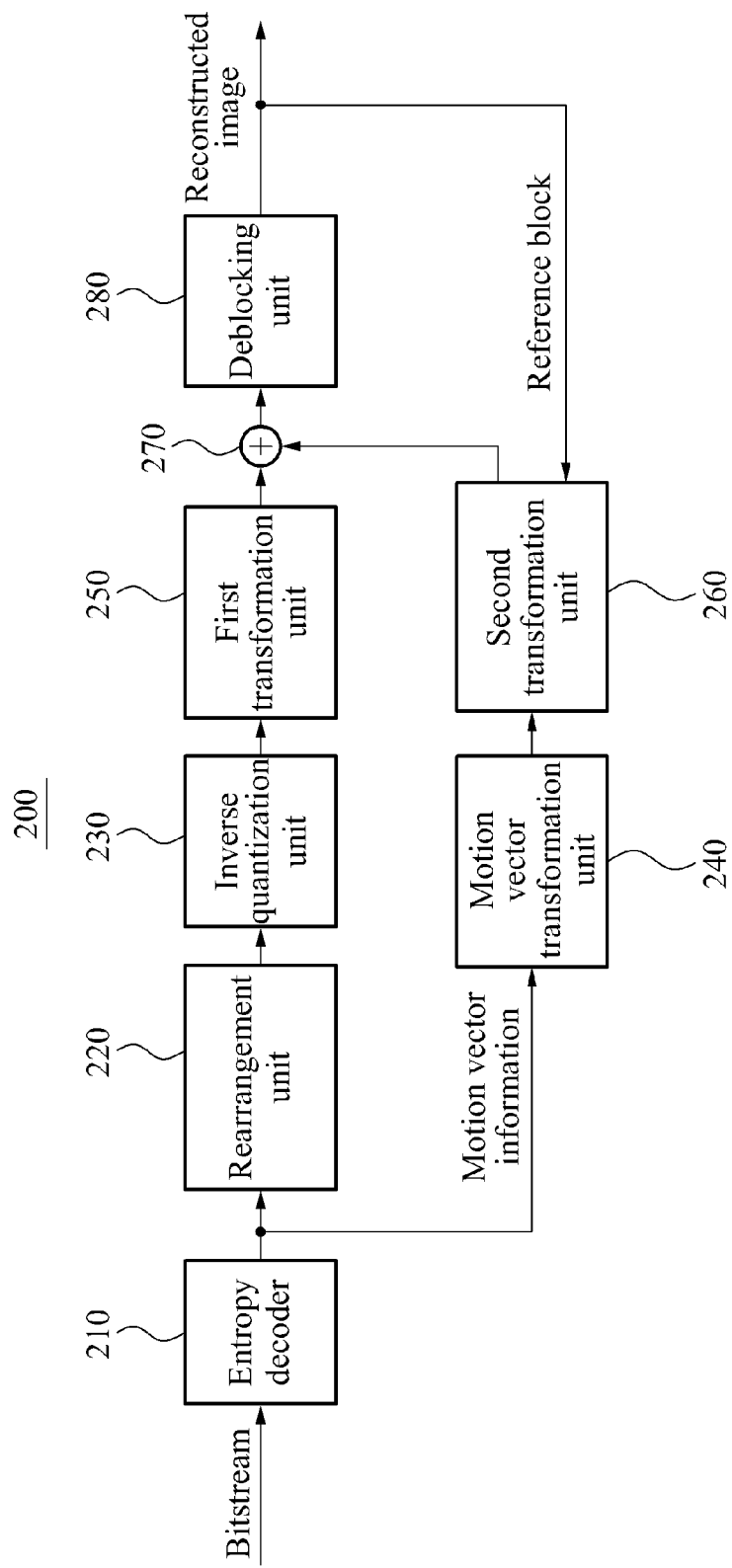
FIG. 2 is a block diagram illustrating an image processing apparatus according to an exemplary embodiment.

FIG. 2 is a block diagram illustrating an image processing apparatus 200 according to an exemplary embodiment.

Referring to FIG. 2, an image decoding apparatus 200 includes an entropy decoder 210, a rearrangement unit 220, an inverse quantization unit 230, a first transformation unit 250, a second transformation unit 260, a deblocking unit 280, a motion vector transformation unit 240, and a synthesis unit 270.

The entropy decoder 210 receives a compressed bitstream and performs entropy decoding to generate quantized coefficients, and extracts motion vector information of a decoded target block.

The rearrangement unit 220 rearranges quantized coefficients accommodated by the entropy decoder 210.

The inverse quantization unit 230 inverse-quantizes rearranged quantized coefficients to reconstruct a differential signal before the inverse quantization.

The first transformation unit 250 generates a differential block having a second resolution. In further detail, the first transformation unit 250 may accommodate a differential block having a first resolution to generate the differential block having the second resolution.

Figure 7:
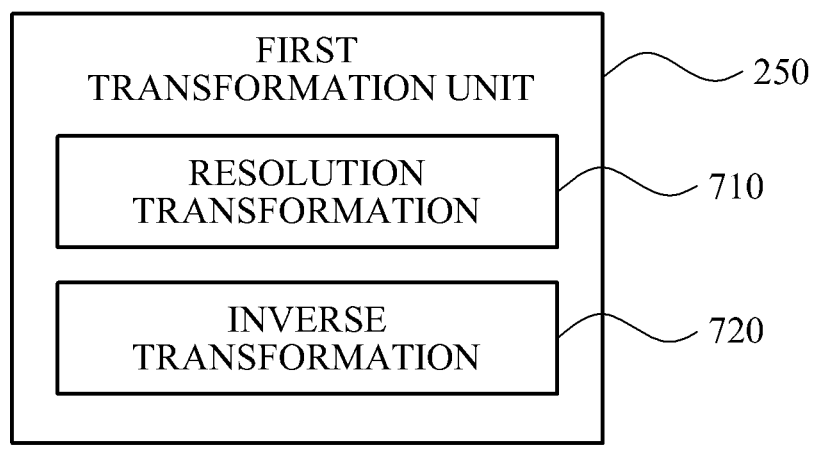
FIG. 7 illustrates a configuration of a first transformation unit according to an exemplary embodiment.

Here, conceptual operations of the first transformation unit 250 include at least one of a resolution transformation 710 and an inverse transformation 720 as in a first transformation unit 770 of FIG. 7. The inverse transformation 720 and the resolution transformation 710 may be performed sequentially or in parallel.

The inverse transformation 720 of the first transformation unit 250 extracts a signal formed of frequency values from the inverse quantization unit 230 and inverse-transforms the extracted signal to generate a differential image of transformed spatial values. The generated differential image is an image constituted by a difference value between a decoded target block and a reference block. The resolution transformation 710 of the first transformation unit 250 transforms a resolution of the generated differential image to generate a differential block by using an inverse transformation and a resolution transformation.

A resolution transformation process is performed by downsizing to lower a resolution or upsizing to increase a resolution. The resolution transformation process may be performed by applying a bilinear filter or Wiener filter.

When applying a bilinear filter to decrease a resolution, an average value of two pixels in a differential image may be used as a pixel value of a differential block with a low resolution. When applying a Wiener filter, a plurality of pixels are multiplied by a filter coefficient obtained using a sync operation and summated, thereby determining a pixel value of a differential block with a low resolution.

Also, when applying a bilinear filter to increase a resolution, an average value of two pixels in a differential image may be interpolated between the pixels to generate an additional pixel value for a higher resolution. When applying a Wiener filter, a plurality of pixels are multiplied by a filter coefficient obtained using a sync operation and summated. The summated pixels are interpolated between the pixels, thereby determining a pixel value for a higher resolution.

In addition to a bilinear filter or Wiener filter, various filters such as a b-spline filter may be used to transform a resolution. A method of applying a filter is not limited to the above examples and may vary.

The second transformation unit 260 generates a prediction block having the second resolution. In further detail, the second transformation unit 260 may accommodate a prediction block having the first resolution to generate the prediction block having the second resolution.

Figure 8:
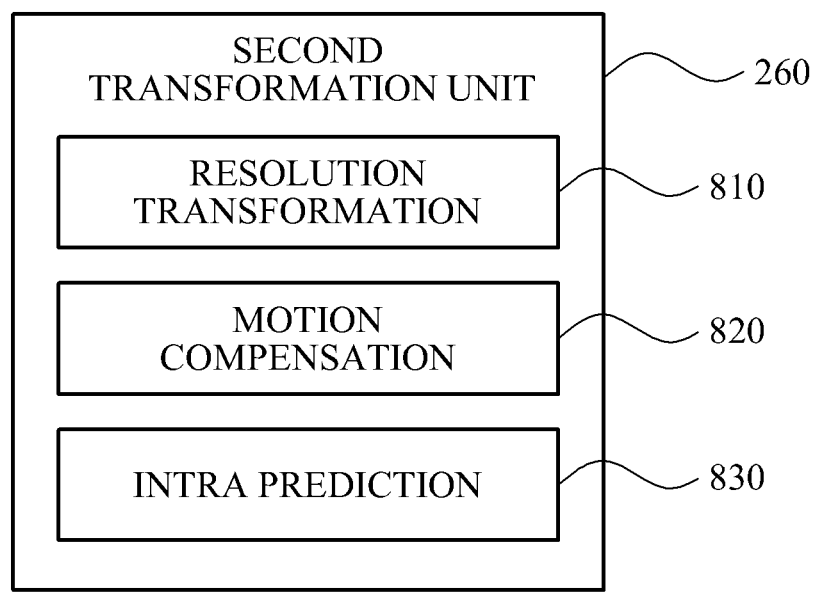
FIG. 8 illustrates a configuration of a second transformation unit according to an exemplary embodiment.

Here, conceptual operation of the second transformation unit 260 include at least one of a resolution transformation 810, a motion compensation 820, and an intra-prediction 830 as in a second transformation unit 260 of FIG. 8.

The resolution transformation 810, the motion compensation 820, and the intra-prediction 830 may be performed sequentially, or two or three operations may be performed at the same time.

The intra-prediction 830 determines a pixel value of a target block based on a pixel value of an adjacent block to the target block in a frame being decoded.

The motion compensation 820 extracts a reference block corresponding to a target block from at least one reference frame positioned before or after a frame being decoded using a motion vector of the target block in the frame being decoded and performs motion compensation using a pixel value of the extracted reference block.

The resolution transformation 810 may be performed through downsizing to lower a resolution, or through upsizing to increase a resolution as described above with reference to the first transformation unit 250, and a bilinear filter or Wiener filter may be applied for these processes. A method of applying these filters is not limited to the examples described in the example embodiment, and various filters may be used.

The second transformation unit 260 generates a prediction block to be synthesized with a differential block generated by the first transformation unit 250 using at least one of the resolution transformation 810, the motion compensation 820, and the intra-prediction 830. A method of generating a prediction block may vary depending on whether a frame to be decoded is an I-frame, P-frame, or Other P-frame with reference to other P-frames.

Figure 4:
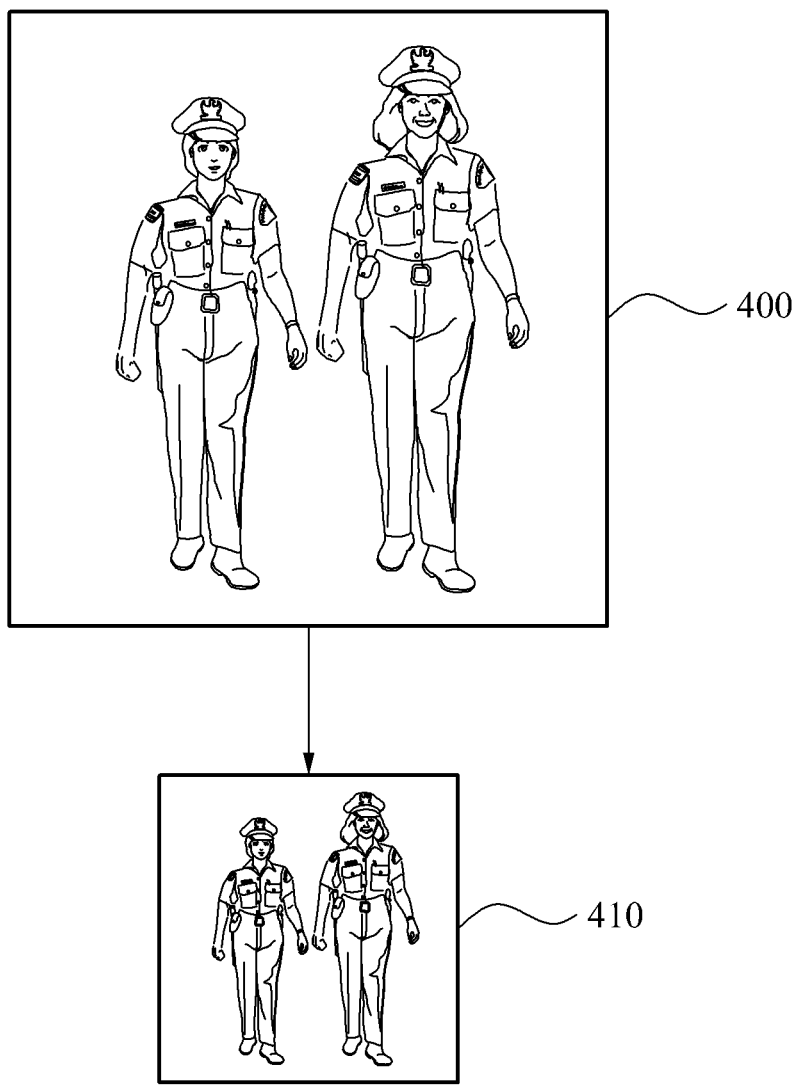
FIG. 4 illustrates an example operation of a second transformation unit of FIG. 2 performing motion compensation and resolution transformation of an I-frame.

FIG. 4 illustrates an example operation of the second transformation unit 260 of FIG. 2 performing motion compensation and resolution transformation of an I-frame.

Referring to FIG. 4, the second transformation unit 260 extracts a pixel value of a target block in a frame 400 to be decoded from adjacent blocks and obtains the target block before resolution transformation using the extracted pixel value. Each obtained block constitutes one frame and generates a frame 410 with the second resolution via the above resolution transformation operation.

Figure 5:
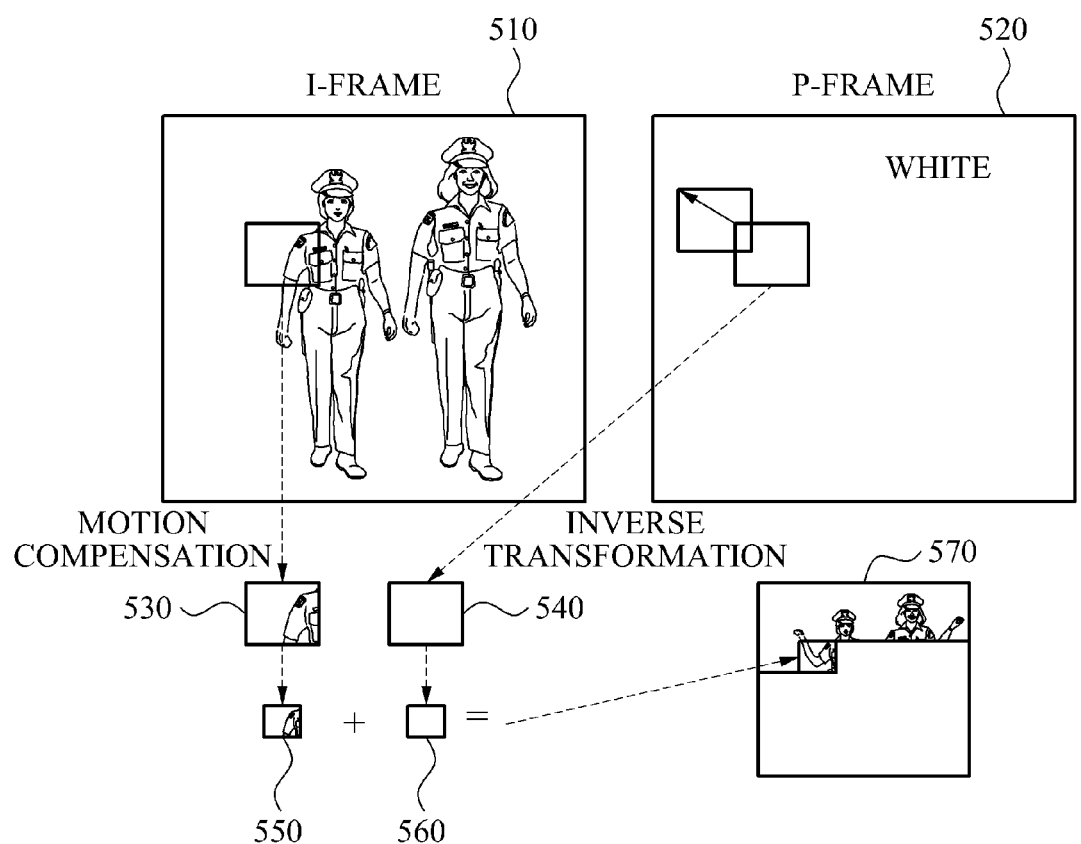
FIG. 5 illustrates an example operation of the second transformation unit of FIG. 2 performing motion compensation and resolution transformation of a P-frame.

FIG. 5 illustrates an example operation of the second transformation unit 260 of FIG. 2 performing motion compensation and resolution transformation of a P-frame.

Referring to FIG. 5, the second transformation unit 260 extracts a reference block indicated by a target block in a frame 520 to be decoded from an I-frame 510 in a front or a rear of the frame using a motion vector extracted from a bitstream. The second transformation unit 260 performs motion compensation based on a pixel value of the extracted reference block to obtain a prediction block 530 having the first resolution. The prediction block 530 having the first resolution is transformed into a prediction block 550 having the second resolution through resolution transformation. The prediction block 550 having the second resolution is synthesized with a differential block 560 having the second resolution transformed from a differential block 540 having the first resolution to generate a target block having the second resolution. The target block having the second resolution generates a P-frame 570 having the second resolution along with another target block.

The motion compensation operation of the second transformation unit 260 may be performed by a fractional pixel unit more precise than an integer pixel in order to increase accuracy of prediction. For example, motion compensation may be implemented using a pixel value of a ½ pixel (half-pel) and a ¼ pixel (quarter-pel) interpolated using an integer pixel of a reference frame.

Motion compensation of the second transformation unit by a fractional pixel unit may be performed sequentially or at the same time along with resolution compensation. In order to perform motion compensation at the same time with the resolution transformation operation, a combination filter is generated from a filter for motion compensation and a filter for resolution transformation and applied to a pixel value of a reference block. The following Table 1 illustrates an example of a combination filter to perform motion compensation and resolution transformation at the same time.

formed pixel value corresponding to a position of a ¼ pixel a 320 positioned between the integer pixel C3 310 and the fractional pixel b 330 using a bilinear filter in Table 1, the pixel value may be generated by applying the combination filter to seven adjacent integer pixels by the following equation $a=(C1-4C2+47C3+72C4+15C5-4C6+C7)>>7$. In the same manner, a ¼ pixel c 340 positioned between b 330 and C4 350 may also be motion-interpolated and resolution-transformed at the same time by application of the above combination filter.

TABLE 1

| KIND OF FILTER | MOTION VECTOR RESOLUTION | FILTER COEFFICIENT |
|---|---|---|
| BILINEAR (2-TAP) | I | $\{0, 0, 64, 64, 0, 0, 0\} >> 7$ |
|  | $Q^1$ | $\{1, -4, 47, 72, 15, -4, 1\} >> 7$ |
|  | H | $\{2, -8, 30, 80, 30, -8, 2\} >> 7$ |
|  | $Q^2$ | $\{1, -4, 15, 72, 47, -4, 1\} >> 7$ |
| WIENER FILTER (7-TAP) | I | $\{0, -0, 48, -72, 89, 382, 89, -72, 48, 0, 0, 0\} >> 9$ |
|  | $Q^1$ | $\{1, -5, 46, -45, 18, 336, 190, -63, 16, 22, -5, 1\} >> 9$ |
|  | H | $\{2, -10, 44, -17, -54, 291, 291, -54, -17, 44, -10, 2\} >> 9$ |
|  | $Q^2$ | $\{1, -5, 22, 16, -63, 190, 336, 18, -45, 46, -5, 1\} >> 9$ |
| WIENER FILTER (12-TAP) | I | $\{0, 0, 64, 0, -128, -96, 160, 608, 832, 608, 160, -96, -128, 0, 64, 0, 0\} >> 11$ |
|  | $Q^1$ | $\{1, -5, 50, 29, -99, -120, 76, 494, 807, 695, 270, -53, -136, -35, 61, 18, -5, 1\} >> 11$ |
|  | H | $\{2, -10, 36, 57, -70, -144, -9, 380, 782, 782, 380, -9, -144, -70, 57, 36, -10, 2\} >> 11$ |
|  | $Q^2$ | $\{1, -5, 18, 61, -35, -136, -53, 270, 695, 807, 494, 76, -120, -99, 29, 50, -5, 1\} >> 11$ |

In Table 1, filter coefficients of a combination filter to perform motion compensation and resolution transformation at the same time may be determined according to a type of filter for resolution transformation and a resolution of a motion vector needed for motion compensation.

Figure 3:
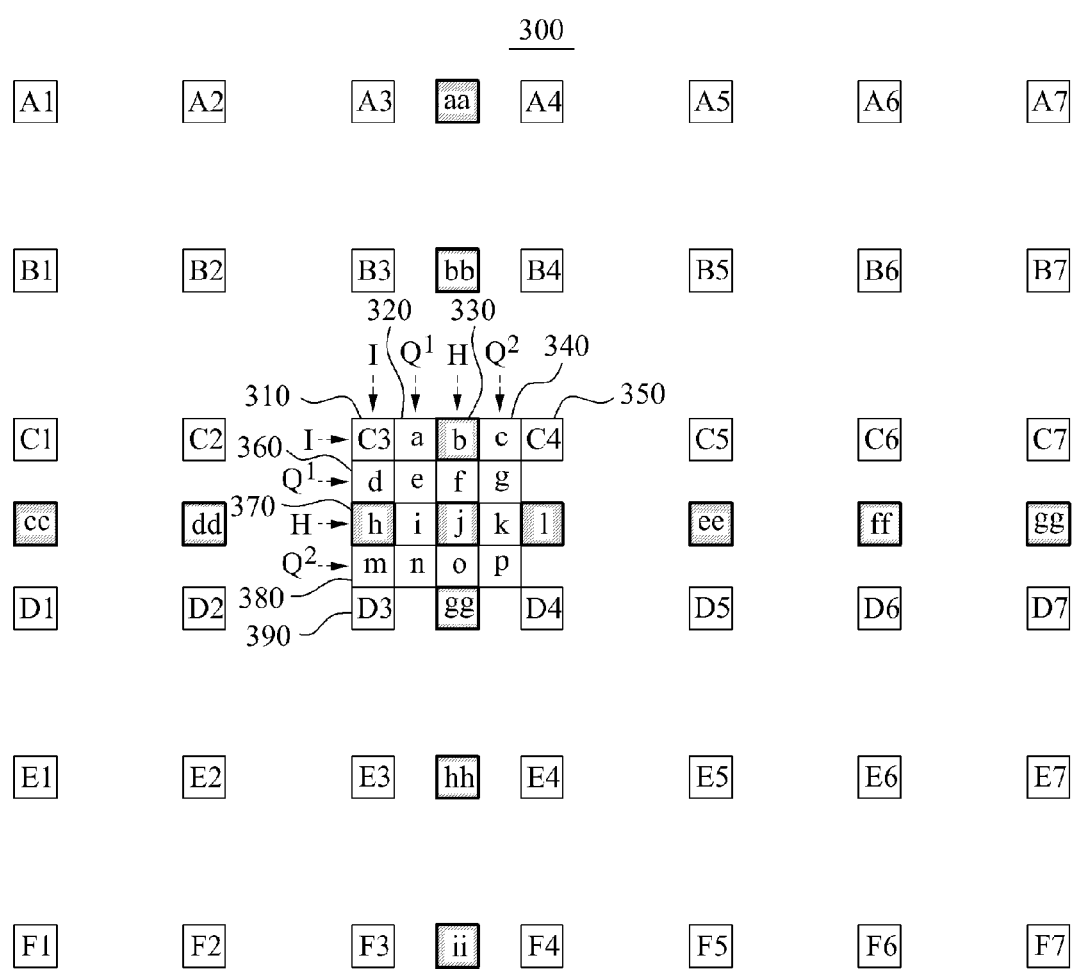
FIG. 3 illustrates motion compensation and resolution transformation processes according to an exemplary embodiment.

FIG. 3 illustrates a motion compensation process and a resolution transformation process according to an exemplary embodiment.

In FIG. 3, capital-letter pixels C3 310, C4 350, D3 390, and D4 represent integer pixels, lowercase-letter pixels in grey b 330, h 370, j, i, and gg represent ½ pixels (half-pels), and lowercase-letter pixels in white a 320, c 340, d 360, e, f, g, i, k, m 380, n, o, and p represent ¼ pixels (quarter-pels).

Referring to FIG. 3, a combination filter in Table 1 is applied to a plurality of adjacent integer pixels in the horizontal or vertical direction to generate a resolution-transformed pixel value. For example, when generating a resolution-transformed pixel value corresponding to a position of a horizontal integer pixel C3 310 using a bilinear filter in Table 1, the pixel value may be generated by applying the combination filter to seven adjacent integer pixels to the integer pixel C3 310 by the following equation $c=(0 \cdot C1+0 \cdot C2+64C3+64C4+0 \cdot C5+0 \cdot C6+0 \cdot C7)>>7$.

Similarly, in order to perform motion interpolation and resolution transformation by a ½ pixel unit at the same time, a plurality of adjacent integer pixels in the horizontal or vertical direction may be applied to a combination filter in Table 1. For example, when generating a resolution-transformed pixel value corresponding to a position of a ½ pixel b 330 positioned between the integer pixels C3 310 and C4 350 using a bilinear filter in Table 1, the pixel value may be generated by applying the combination filter to seven adjacent integer pixels by the following equation $b=(2C1-8C2+30C3+80C4+30C5-8C6+C2)>>7$.

Similarly, in order to perform motion interpolation and resolution transformation by a ¼ pixel unit at the same time, a plurality of adjacent integer pixels in the horizontal or vertical direction may be applied to a combination filter in Table 1. For example, when generating a resolution-trans- Although a bilinear filter or Wiener filter is given in Table 1 as an example of a combination filter to perform motion compensation and resolution transformation at the same time, a type of filter according to another exemplary embodiment is not limited thereto, but may include other filters or may vary. Further, a motion resolution may also not be limited to the present exemplary embodiment but may employ a pixel unit having a different precision.

Figure 6:
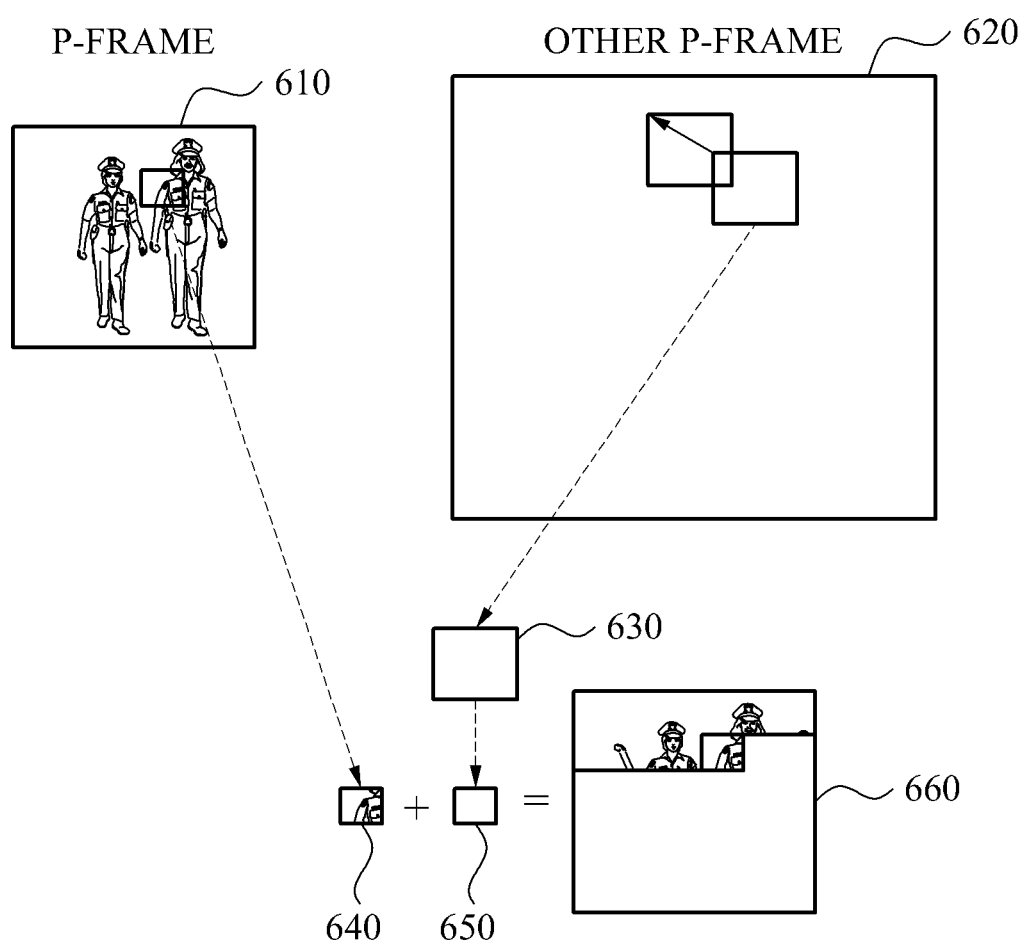
FIG. 6 illustrates an example operation of the second transformation unit of FIG. 2 performing motion compensation and resolution transformation of an Other P-frame.

FIG. 6 illustrates an example operation of the second transformation unit 260 of FIG. 2 performing motion compensation and resolution transformation of Other P-frame.

Referring to FIG. 6, the second transformation unit 260 extracts a reference block indicated by a target block in a frame 620 to be decoded from a P-frame in a front or a rear of the frame using a motion vector extracted from a bitstream. Here, since the front or the rear P-frame 610 is an already resolution-transformed frame, when using the extracted motion vector as is for reference, a position of the reference block corresponding to the target block may not be detected accurately. Thus, a magnitude of the motion vector may need to be transformed through a motion vector transformation unit in order for the motion vector of the target block to accurately indicate the position of the reference block. The second transformation unit 260 performs motion compensation using the magnitude-changed motion vector through the motion vector transformation unit 240 to generate a predication block 640. The predication block 640 having the second resolution is synthesized with a differential block 650 having the second resolution transformed from a differential block 630 having the first resolution to generate a target block having the second resolution. The target block having the second resolution generates an Other P-frame 660 having the second resolution along with another target block.

The motion vector transformation unit 240 changes a magnitude of a motion vector extracted from a bitstream in proportion to a resolution of an image to be displayed. When a resolution is high, a magnitude of a motion vector may increase proportionally. When a resolution is low, a magnitude of a motion vector may decrease proportionally.

The second transformation unit 260 extracts a reference block indicated by a target block in a frame being decoded from a P-frame in a front or a rear of the frame using a motion vector changed in magnitude via the motion vector transformation unit 240. The second transformation unit 260 performs motion compensation using a pixel value of the reference block to generate a prediction block.

Motion compensation of the second transformation unit 260 to generate a prediction block may be performed by a fractional pixel unit in order to increase accuracy of prediction. Precise motion compensation may be implemented using a pixel value of a ½ pixel (half-pel) and a ¼ pixel (quarter-pel) interpolated using adjacent pixels of a reference frame.

Here, motion compensation may be performed using a magnitude-transformed motion vector. For example, when decreasing a resolution by half, a magnitude of a motion vector decreases by half. Thus, when a reference block is used to perform motion compensation by an integer pixel unit, a target block to be decoded may need interpolation by a ½ pixel unit. Similarly, when a reference block is used to perform motion compensation by a ½ pixel unit, a target block may need interpolation by a ¼ pixel unit. Further, when a reference block is used to perform motion compensation by a ¼ pixel unit, a target block may need interpolation by a ⅛ pixel (rational-pel) unit.

Motion compensation of the second transformation unit 260 may be performed sequentially or at the same time along with resolution compensation. In order to perform motion compensation at the same time with the resolution transformation operation, a combination filter is generated from a filter for motion compensation and a filter for resolution transformation and applied to a pixel value of a reference block. The following Table 2 illustrates an example of a combination filter to perform motion compensation and resolution transformation at the same time in order to generate a ⅛ pixel when a magnitude of a motion vector decreases by half.

TABLE 2

| KIND OF FILTER | MOTION VECTOR RESOLUTION | FILTER COEFFICIENT |
|---|---|---|
| WIENER INTERPOLATION FILTER (6-TAP) | $R^1$ | $\{1, -5, 116, 20, -5, 0\} \gg 7$ |
| | $Q^1$ | $\{2, -10, 104, 40, -10, 2\} \gg 7$ |
| | $R^2$ | $\{3, -15, 92, 60, -15, 3\} \gg 7$ |
| | H | $\{4, -20, 80, 80, -20, 4\} \gg 7$ |
| | $R^3$ | $\{3, -15, 60, 92, -15, 3\} \gg 7$ |
| | $Q^2$ | $\{2, -10, 40, 104, -10, 2\} \gg 7$ |
| | $R^4$ | $\{1, -5, 20, 116, -5, 1\} \gg 7$ |

In Table 2, filter coefficients of a combination filter to perform motion compensation and resolution transformation at the same time may be determined according to a resolution of a motion vector needed for motion compensation.

The second transformation unit applies a plurality of adjacent integer pixels in the horizontal or vertical direction to a combination filter in Table 2 to generate a motion-compensated and resolution-transformed pixel value.

For example, with reference to FIG. 3, when generating a resolution-transformed pixel value corresponding to a ⅛ pixel positioned between the integer pixel C3 310 and the fractional pixel a 320 in the horizontal direction, a combination filter may be applied to six adjacent integer pixels by the following equation r=(C1−5C2+116C3+20C4−C5+0·C6)≫7.

Similarly, for motion interpolation and resolution transformation of a ½ pixel and a ¼ pixel, the above combination filter is used to generate a motion-interpolated and resolution-transformed pixel value.

The synthesis unit 270 synthesizes a prediction block motion-compensated and resolution-transformed in the second transformation unit 260 and a differential block inverse-transformed and resolution-transformed in the first transformation unit 250, thereby generating a resolution-transformed target block. The resolution-transformed target block is synthesized with a plurality of other target blocks to generate one frame.

The inverse transformation 720 and the resolution transformation 710 of the first transformation unit 250 may be performed sequentially or at the same time. When the inverse transformation 720 and the resolution transformation 710 are performed sequentially, an inverse quantization of a differential image $A_{4 \times 4}$ in a 4×4 frequency received via the inverse quantization unit 230 is expressed by the following Equation 1.

$$R_{4 \times 4} = C_i^T \cdot A_{4 \times 4} \cdot C_i, \quad \text{[Equation 1]}$$

$$C_i = \begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix}.$$

In Equation 1, $R_{4 \times 4}$ is an inverse-transformed 4×4 differential image, C, is an inverse transformation function used for various standards, e.g., H.264/AVC, and $C_i^T$ denotes a transposed matrix of $C_i$. $R_{4 \times 4}$ generated by Equation 1 is resolution-transformed by the following Equation 2.

$$R_{2 \times 2} = D_{2 \times 2}^T \cdot P_{2 \times 4} \cdot D_{4 \times 4} \cdot R_{4 \times 4} \cdot D_{4 \times 4}^T \cdot P_{4 \times 2} \cdot D_{2 \times 2}, \quad \text{[Equation 2]}$$

$$P_{2 \times 4} = \begin{bmatrix} 1 & 0 & 0 & 0 \\ 0 & 1 & 0 & 0 \end{bmatrix}.$$

In Equation 2, $R_{2 \times 2}$ is a resolution-transformed 2×2 differential image, $D_{2 \times 2}$ and $D_{4 \times 4}$ are a basis function to perform a discrete cosine transform (DCT) operation on a 4×4 matrix and a 2×2 matrix, respectively, and P is a function for degree transformation. Equation 2 illustrates a process of obtaining a differential block $R_{2 \times 2}$ by performing resolution transformation and inverse transformation in the vertical and horizontal directions, respectively, based on the matrix $R_{4 \times 4}$.

The inverse transformation 720 and the resolution transformation 710 of the first transformation unit 250 may be performed at the same time. That is, the horizontal and vertical inverse transformation and resolution transformation in Equation 2 are combined to express a single equation to obtain a differential block. The following Equation 3 illustrates a process of transforming the received differential image in the 4×4 frequency into a 2×2 spatial value using the single equation.

$$R_{2 \times 2} = K_{2 \times 4} \cdot A_{4 \times 4} \cdot G_{4 \times 2}, \quad \text{[Equation 3]}$$

$$K_{2 \times 4} = \begin{bmatrix} 1.4142 & 1.1152 & 0 & 0.0793 \\ 1.4142 & -1.1152 & 0 & -0.0793 \end{bmatrix},$$

$$G_{4 \times 2} = \begin{bmatrix} 0.7071 & 0.5576 & 0 & 0.0396 \\ 0.7071 & -0.5576 & 0 & -0.0396 \end{bmatrix}^T.$$

In Equation 3, a matrix $K_{2\times4}$ is an equation to perform resolution transformation and inverse transformation in the vertical direction at the same time in a DCT domain, and a matrix $G_{4\times2}$ is an equation to perform resolution transformation and inverse transformation in the horizontal direction at the same time in the DCT domain.

In Equation 3, matrices $K_{2\times4}$ and $G_{4\times2}$ may use a coefficient transformed into an integer to decrease a complexity of calculation. For example, when calculating using a coefficient 1.4142 in a 1×1 of a matrix $K_{4\times2}$, the coefficient is left-shifted by 8 bits before the calculation to be transformed into an integer coefficient multiplied by $2^8$. Then, after completing the calculation, the coefficient is right-shifted by 8 bits, thereby obtaining a final result divided by $2^8$.

The 2×2 differential image generated by the above process in the first transformation unit 250 is synthesized with a prediction block generated by the second transformation unit 260 to generate a resolution-transformed target block.

The above image processing process may be used to predict a complexity of a bitstream and determine a decoding mode to reach a target complexity.

Figure 9:
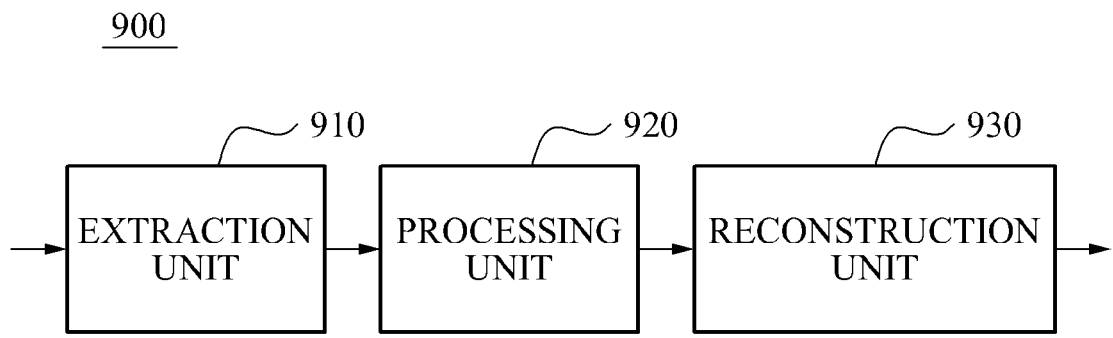
FIG. 9 is a block diagram illustrating a decoding mode determination apparatus according to an exemplary embodiment.

FIG. 9 is a block diagram illustrating a decoding mode determination device 900 according to an exemplary embodiment.

Referring to FIG. 9, the decoding mode determination device 900 of an image includes an extraction unit 910, a processing unit 920, and a reconstruction unit 930.

The extraction unit 910 extracts information to predict a decoding complexity of an image from a bitstream of the image. The information to predict a decoding complexity of a received image may include at least one of a frame height (FH) that is a resolution of an image, a frame rate (FR) to indicate a number of received frames per second, a quantization parameter value, and the like.

The processing unit 920 predicts a complexity of an image using information obtained by the extraction unit 910 and accommodates a target complexity. Furthermore, the processing unit 920 calculates a complexity ratio using the complexity of the image and the target complexity to reach the target complexity. Moreover, the processing unit 920 determines a decoding mode using the calculated complexity ratio.

Specifically, in order to predict a complexity of an image, the processing unit 920 uses an FH that is a resolution of the image obtained by the extraction unit 910, an FR to indicate a number of received frames per second, or a quantization parameter value. Here, the processing unit 920 calculates a value $T_e$ to predict a complexity of an image by performing a predetermined operation using a value obtained by multiplying each predicated value by a predetermined magnitude value.

Furthermore, the processing unit 920 accommodates a target complexity. The target complexity is a value associated with time involved in reproducing a reconstructed image by an image processing apparatus and may be determined based on a resource or a preset configuration of the image processing apparatus. In further detail, the target complexity may be calculated using a number of frames to reproduce a reconstructed image per second. For example, when the number of frames reproduced per second is 30 frames per second (FPS), a target complexity may be calculated by the following Equation 4.

$$T_c = 1000/FR_i \text{(ms)} \quad \text{[Equation 4]}$$

In Equation 4, $T_c$ is a target complexity, and $FR_i$ is a target FR. When 30 FPS is a target, a target complexity is a $T_c$ of 1000/30 (FPS)=33.333 ms. That is, a 30FPS bitstream is targeted to decode a single frame in about 33.333 ms.

As described above, the processing unit 920 which calculates a complexity of an image and a target complexity may obtain a complexity ratio to determine a decoding mode using calculated complexities. For example, a complexity ratio to determine a decoding mode may be defined by the following Equation 5.

$$\operatorname*{argmin}_{DMn} \Delta T \text{ subject to } \alpha \cdot \Delta T > \frac{T_e - T_c}{T_e}, \quad \text{[Equation 5]}$$

where $\alpha$ is a constant determined experimentally. For example, when a target complexity $T_c$ is 33.333 ms, a predicted complexity of a received image is 43.859 ms, and $\alpha$ is 1, a complexity ratio $\Delta T$ to determine a decoding mode is 24% according to Equation 5.

The processing unit 920 may determine a decoding mode from modes provided according to a complexity and image quality using a calculated complexity ratio $\Delta T$. A decoding mode is a mode to reconstruct an image, and may perform decoding or resolution transformation of a compressed image according to a determined mode or perform decoding and resolution transformation of a compressed image at the same time.

A decoding mode may be determined by decoding and resolution transformation schemes. Table 3 below shows an example decoding mode available for decoding and resolution transformation of a compressed image. Referring to Table 3, a decoding mode may be determined by a combination of a type of filter, a resolution of a motion vector, a masking value for inverse transformation, and a value to represent whether deblocking filtering is performed. In FIG. 3, a type of filter is a bilinear filter or a Wiener filter, a motion resolution unit uses ¼ or ⅛ interpolation, a masking value for inverse transformation includes a 2×2 or 4×4 block. However, the above decoding mode is merely an example to perform decoding or resolution transformation of an image, and a combination for a decoding mode according to another exemplary embodiment may not be limited thereto and may vary.

TABLE 3

| | MOTION COMPENSATION | | | |
|---|---|---|---|---|
| | RESOLUTION TRANSFORMATION FILTER | MOTION VECTOR RESOLUTION | INVERSE TRANSFORMATION MASKING | DEBLOCKING FILTER |
| SELECTION MODE | BILINEAR (B) 7-TAP FILTER (S) 13-TAP FILTER (W) | UP TO R-PEL/ UP TO Q-PEL | 4 × 4/2 × 2 | ON/OFF |

Figure 10:
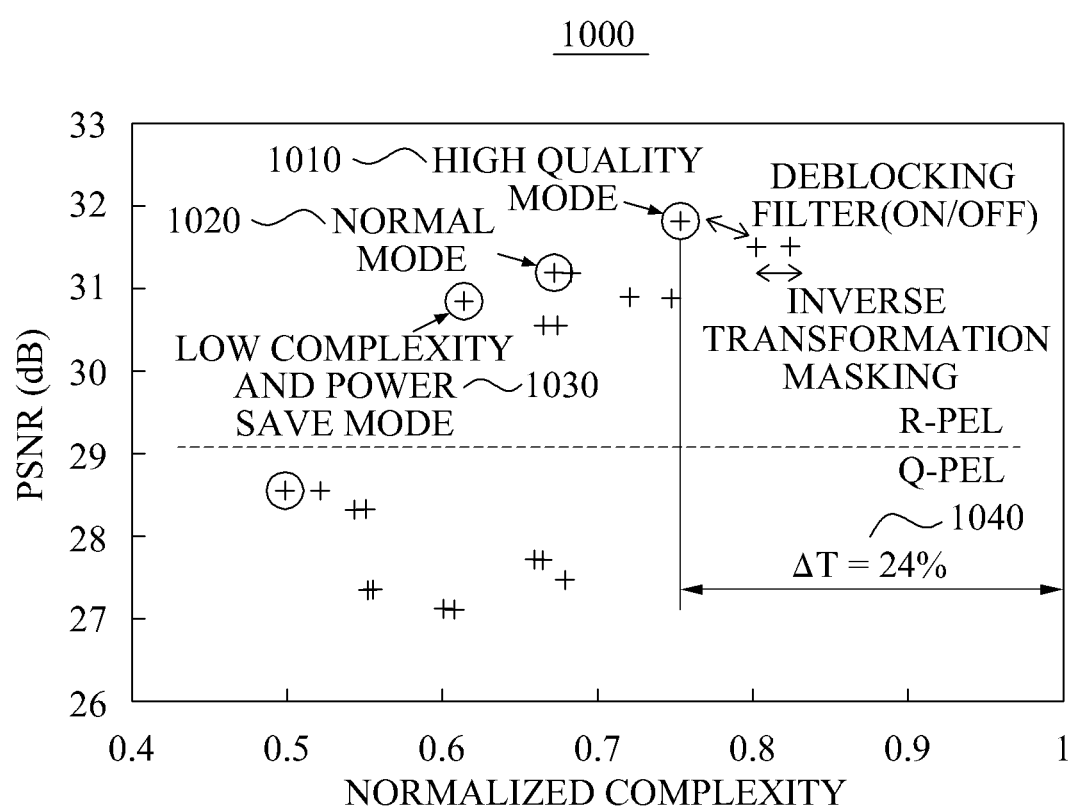
FIG. 10 illustrates an example of determining a decoding mode.

FIG. 10 illustrates examples of a decoding mode of a selective combination of the operations in Table 3 displayed according to a complexity and image quality. In FIG. 10, an x coordinate denotes a normalized complexity ratio based on decoding and resolution transformation values which the functions associated with the above decoding mode are not applied to, and a y coordinate denotes a peak signal-to-noise ratio (PSNR) to represent image quality.

In FIG. 10, a sign | denotes all results of combinations of the operations in Table 3. Further, a sign ⊕ denotes a high efficiency mode among the results of the combinations. In FIG. 10, the high efficiency mode includes a high quality mode 1010, a normal mode 1020, and a low complexity and power save mode 1030.

The high quality mode 1010 is a decoding mode in which a filter is a 13-tap Wiener filter, a resolution of a motion vector is a ⅛ pixel, a masking value for inverse transformation employs a 4×4 block, and a deblocking filter is not used. The normal mode 1020 is a decoding mode in which a filter is a 7-tap Wiener filter, a resolution of a motion vector is a ⅛ pixel, a masking value for inverse transformation employs a 2×2 block, and a deblocking filter is not used. The low complexity and power save mode 1030 is a decoding mode in which a filter is a bilinear filter, a resolution of a motion vector is a ⅛ pixel, a masking value for inverse transformation employs a 4×4 block, and a deblocking filter is not used.

The processing unit 920 may select the high quality mode having a 24% complexity performance improvement in FIG. 10 when ΔT 1040 is calculated into 24% by the above Equation 5. Here, the image processing apparatus may reconstruct a received image in the high quality mode.

The processing unit 920 may receive a mode used for decoding from a user in order to determine a decoding mode. For example, a plurality of decoding modes as described above are provided to a user, and the user may select a desired decoding mode. Moreover, the processing unit 920 may use a resource or a preset configuration of an image processing apparatus in order to determine a decoding mode.

The reconstruction unit 930 performs resolution transformation or decoding of a received image, or performs resolution transformation or decoding of a received image at the same time according to a decoding mode determined by the processing unit 920. Resolution transformation and decoding may be performed sequentially or at the same time. An example of the reconstruction unit 930 may be the image forming apparatus 200 in FIG. 2 or a part of the image forming apparatus 200 in FIG. 2 but is not limited thereto. The reconstruction unit 930 may include other devices which are capable of performing resolution transformation or decoding.

Figure 11:
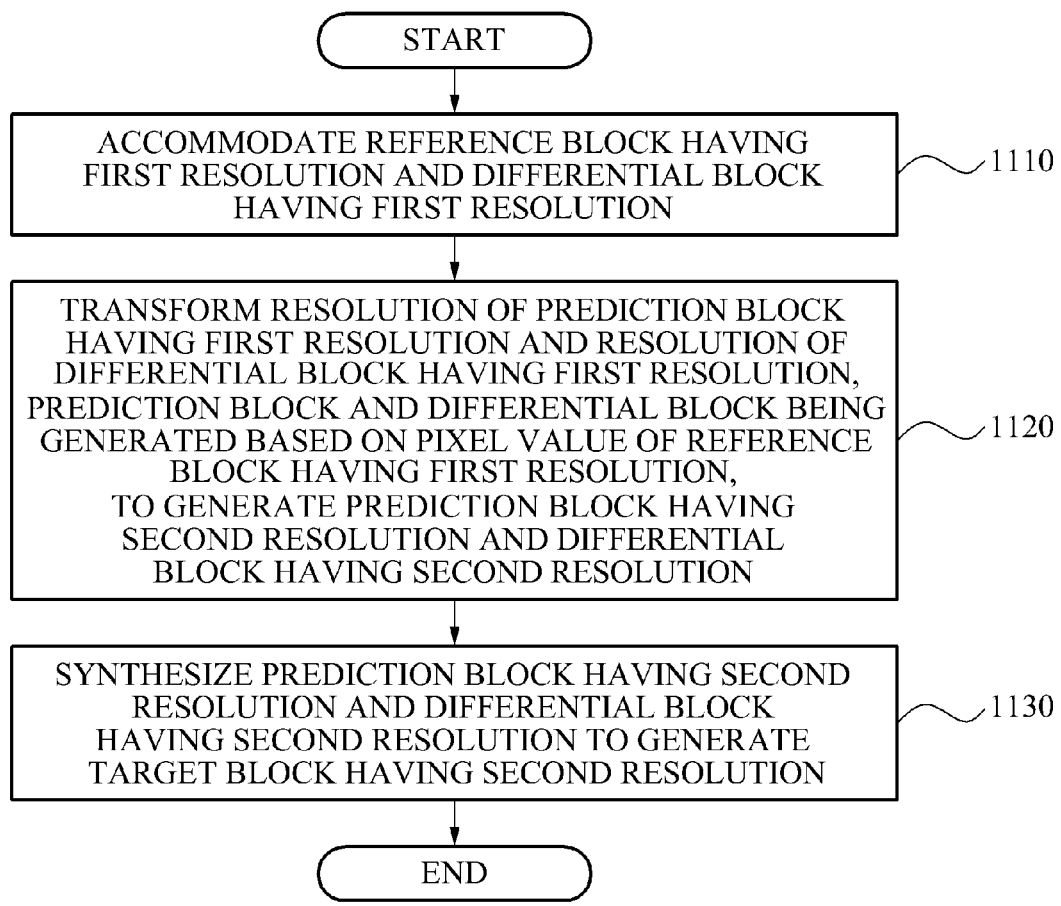
FIG. 11 is a flowchart illustrating an image decoding process according to an exemplary embodiment.

FIG. 11 is a flowchart illustrating an image decoding process according to an exemplary embodiment.

Referring to FIG. 11, an image decoding apparatus according to an exemplary embodiment accommodates a reference block having a first resolution and a differential block having the first resolution in operation 1110. As described above, the reference block is a block to which a target block having the first resolution in a frame to be decoded refers in order to perform motion compensation. Further, the differential block having the first resolution is an image constituted by a difference between the reference block and the target block having the first resolution.

Then, the image decoding apparatus according to the present exemplary embodiment generates a prediction block having the first resolution based on a pixel value of the reference block having the first resolution and transforms a resolution of the prediction block to generate a prediction block having the second resolution in operation 1120. In operation 1120, motion compensation may be performed by an inter pixel unit or a fractional pixel unit according to a resolution of a motion vector. When performing motion compensation by a fractional pixel unit, as described above, a pixel value of an adjacent area to the reference block having the first resolution may be used to generate a pixel value of the prediction block having the first resolution.

Operation 1120 may include performing resolution transformation and performing motion compensation, and the two operations may be performed at the same time.

When the two operations are performed at the same time, a combination filter may be used as described above. The combination filter is determined according to a resolution of a motion vector and a type of filter to transform the resolution. For example, different combination filters that may be used are an inter pixel, ½ pixel, ¼ pixel, or ⅛ pixel, depending on a resolution of a motion vector. Moreover, the combination filter may be determined based on a type of filter to transform the resolution.

The image decoding apparatus according to the present exemplary embodiment transforms a resolution of the accommodated differential block having the first resolution to generate a differential block having the second resolution in operation 1120. Operation 1120 may be performed at the same time with an inverse transformation to generate a spatial value by inverse transformation of a differential image of the reference block having the first resolution and the target block having the first resolution.

In operation 1130, the differential block having the second resolution and the prediction block having the second resolution generated in operation 1120 are synthesized to generate a target block having the second resolution.

Figure 12:
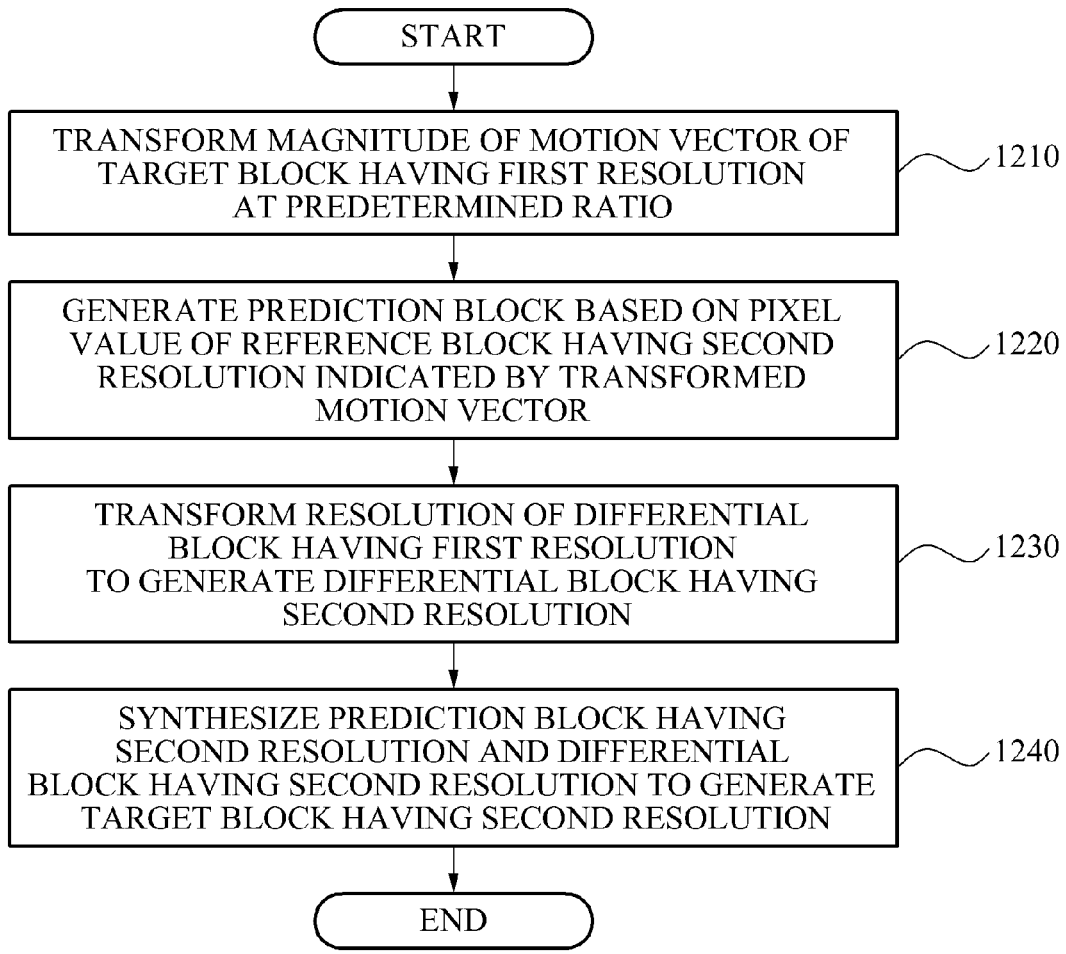
FIG. 12 is a flowchart illustrating an image decoding process according to another exemplary embodiment.

FIG. 12 is a flowchart illustrating an image decoding process according to another exemplary embodiment.

Referring to FIG. 12, in operation 1210, in order for a target block having a first resolution in a frame being decoded to search for a reference block for motion compensation, a magnitude of a motion vector of the target block is transformed at a predetermined ratio. Here, the reference block is a block in a frame where a resolution has already been transformed and has a second resolution. The magnitude of the transformed motion vector is proportionate to a ratio of a downsizing or upsizing resolution as described above.

In operation 1220, a prediction block having the second resolution is generated based on the reference block having the second resolution indicated by the transformed motion vector. As described above, motion compensation to generate the prediction block having the second resolution may be performed by a more precise fractional pixel unit than motion compensation by the reference block having the second resolution in order to increase accuracy of prediction.

In operation 1230, a differential block having the first resolution is transformed into a differential block having the second resolution through a resolution transformation process. The differential block having the first resolution is defined based on a difference between a reference block having the first resolution and the target block having the first resolution. The operation of transforming a resolution of the differential block having the first resolution to generate the differential block having the second resolution may be performed at the same time with a process of generating a spatial value by inverse transformation of a differential image of the first reference block having the first resolution and the target block having the first resolution.

In operation 1240, the prediction block having the second resolution and the differential block having the second resolution generated in operation 1220 and operation 1230, respectively, are synthesized to generate a target block having the second resolution.

The above image processing process may be used for a decoding mode determination process to perform reconstruction and resolution transformation of an image by predicting a complexity of a bitstream.

Figure 13:
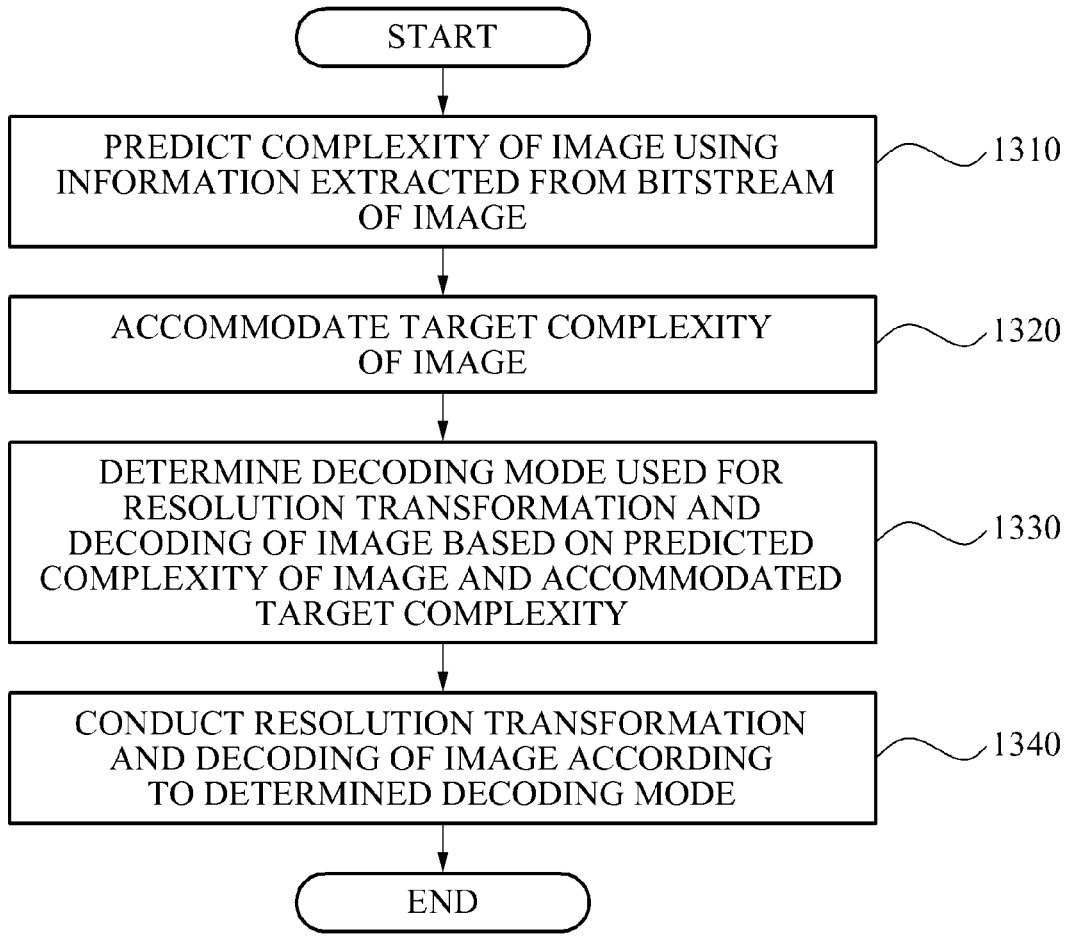
FIG. 13 is a flowchart illustrating a decoding mode determination process according to an exemplary embodiment.

FIG. 13 is a flowchart illustrating a decoding mode determination process according to an exemplary embodiment.

In operation 1310, a complexity of an image is predicted using information extracted from a bitstream of the image. The information to predict a complexity of an image includes at least one of a measurement of time involved in decoding an image without resolution transformation in an offline state, an FH that is a resolution of an image, an FR to indicate a number of received frames per second, and a quantization parameter value.

In operation 1320, a target complexity that is an aimed complexity is accommodated. The target complexity is a value associated with time involved in reproducing a reconstructed image by an image processing apparatus and may be determined based on a resource or a preset configuration of the image processing apparatus. In further detail, the target complexity may be calculated using a number of frames to reproduce one reconstructed image per second.

In operation 1330, a decoding mode used to perform resolution transformation and decoding of the image is determined based on the complexity of the image predicted in operation 1310 and the target complexity of the image accommodated in operation 1320.

The decoding mode is a mode to reconstruct an image, and may perform decoding or resolution transformation of a compressed image based on a determined mode, or may perform decoding and resolution transformation of a compressed image at the same time.

The decoding mode may be determined based on a resource or a preset configuration of the image forming apparatus. Alternatively, a plurality of decoding modes are provided to a user, and the user may select a desired decoding mode.

The decoding mode may be determined using a difference in magnitude between the complexity of the image and the target complexity. Here, as described above, a complexity ratio is calculated by Equation 5, and the calculated complexity ratio is used to determine a decoding mode.

The decoding mode may be selected from among a plurality of modes, and each of the modes may be a combination using at least one of a type of filter, a type of motion vector, a type of masking value for inverse transformation, and information about whether deblocking filtering is performed, but is not limited thereto.

In operation 1340, resolution transformation and decoding of the image are performed using the decoding mode determined in operation 1330. Resolution transformation and decoding may be performed sequentially or at the same time. An example to perform decoding may be the image forming apparatus 200 in FIG. 2 or a part of the image forming apparatus 200 in FIG. 2, but is not limited thereto. The example may include other devices which are capable of performing resolution transformation or decoding.

The above-described exemplary embodiments may be recorded in non-transitory computer-readable media including program instructions to implement various operations embodied by a computer. The media may also include, alone or in combination with the program instructions, data files, data structures, and the like. Moreover, one or more units of the image processing apparatus 200 and the decoding mode determination device 900 can include a processor or microprocessor executing a computer program stored in a computer-readable medium.

Although a few exemplary embodiments have been shown and described above, exemplary embodiments are not limited thereto. Instead, it would be appreciated by those skilled in the art that changes may be made to these exemplary embodiments without departing from the principles and spirit of the disclosure, the scope of which is defined by the claims and their equivalents.

What is claimed is:

1. An image processing method of an image processing apparatus, the method comprising:
    obtaining a reference block a having a first resolution and a differential block having the first resolution;
    transforming a resolution of a prediction block having the first resolution and a resolution of the differential block having the first resolution in order to generate a prediction block having a second resolution and a differential block having the second resolution, the prediction block having the first resolution and the differential block having the first resolution being generated based on a pixel value of the reference block having the first resolution; and
    synthesizing the generated prediction block having the second resolution and the generated differential block having the second resolution in order to generate a target block having the second resolution.

2. A non-transitory computer readable recording medium having recorded thereon a program executable by a computer for performing the method of claim 1.

3. An image processing method of an image processing apparatus, the method comprising:
    transforming a magnitude of a motion vector of a target block having a first resolution at a predetermined ratio in order to generate a transformed motion vector;
    generating a prediction block having a second resolution based on a pixel value of a reference block having the second resolution indicated by the transformed motion vector;
    transforming a resolution of a differential block having the first resolution in order to generate a differential block having the second resolution; and
    synthesizing the generated prediction block having the second resolution and the generated differential block having the second resolution in order to generate a target block having the second resolution.

4. A non-transitory computer readable recording medium having recorded thereon a program executable by a computer for performing the method of claim 3.

5. An image processing apparatus comprising:
    a first transformation unit which transforms a differential block having a first resolution into a differential block having a second resolution in order to generate the differential block having the second resolution;
    a second transformation unit which transforms a prediction block having the first resolution, generated based on a pixel value of a reference block having the first resolution, into a prediction block having the second resolution in order to generate the prediction block having the second resolution; and
    a synthesis unit which synthesizes the generated prediction block having the second resolution and the generated differential block having the second resolution in order to generate a target block having the second resolution.

6. An image processing apparatus comprising:
    a motion vector transformation unit which transforms a magnitude of a motion vector of a target block having a first resolution at a predetermined ratio in order to generate a transformed motion vector;
    a second transformation unit which generates a prediction block having a second resolution based on a pixel value of a reference block having the second resolution indicated by the transformed motion vector;

a first transformation unit which transforms a resolution of a differential block having the first resolution in order to generate a differential block having the second resolution; and a synthesis unit which synthesizes the generated prediction block having the second resolution and the generated differential block having the second resolution in order to generate a target block having the second resolution.

7. An image processing method of an image processing apparatus, the method comprising:

predicting a complexity of an image using information extracted from a bitstream of the image;

obtaining a target complexity associated with reproducing the image;

determining a decoding mode used for resolution transformation and decoding of the image based on the complexity of the image and the target complexity; and performing the resolution transformation and the decoding of the image according to the determined decoding mode, wherein the information to predict the complexity of the image comprises at least one of a resolution, a frame rate, and a quantization parameter of the image.

8. The method of claim 7, wherein the target complexity is a value determined based on at least one of a resource and a preset configuration of the image processing apparatus.

9. The method of claim 7, wherein the decoding mode is determined by selection of at least one of a resource of the image processing apparatus, a preset configuration of the image processing apparatus, and an option of a user.

10. The method of claim 7, wherein the determining the decoding mode comprises selecting the decoding mode from among a plurality of decoding modes, and each of the plurality of decoding modes is associated with at least one of a resolution transformation and a decoding scheme of the image.

11. The method of claim 7, wherein the determining the decoding mode comprises determining the decoding mode based on a difference in magnitude between the complexity of the image and the target complexity.

12. The method of claim 7, wherein the decoding mode has a single combination among combinations including at least two of a type of filter, a resolution of a motion vector, a masking value for inverse transformation, and a value to represent whether deblocking filtering is performed.

13. A non-transitory computer readable recording medium having recorded thereon a program executable by a computer for performing the method of claim 7.

14. An image processing apparatus comprising:

an extraction unit which extracts information from a bitstream of an image to predict a complexity of the image;

a processing unit which determines a decoding mode used for resolution transformation and decoding of the image according to the complexity of the image predicted based on the extracted information and a target complexity associated with reproducing the image; and a reconstruction unit which performs the resolution transformation and the decoding of the image according to the determined decoding mode, wherein the information to predict the complexity of the image comprises at least one of a resolution, a frame rate, and a quantization parameter of the image.

15. The image processing apparatus of claim 14, wherein the target complexity is a value determined based on at least one of a resource and a preset configuration of the image processing apparatus.

16. The image processing apparatus of claim 14, wherein the decoding mode is determined by selection of at least one of a resource of the image processing apparatus, a preset configuration of the image processing apparatus, and an option of a user.

17. The image processing apparatus of claim 14, wherein the processing unit selects the decoding mode from among a plurality of decoding modes, and each of the plurality of decoding modes is associated with at least one of a resolution transformation and a decoding mode of the image.

18. The image processing apparatus of claim 14, wherein the processing unit determines the decoding mode based on a difference in magnitude between the complexity of the image and the target complexity.

19. The image processing apparatus of claim 14, wherein the decoding mode has a single combination among combinations including at least two of a type of filter, a resolution of a motion vector, a masking value for inverse transformation, and a value to represent whether deblocking filtering is performed.

20. The image processing apparatus of claim 14, wherein the reconstruction unit comprises:

a first transformation unit which, when the image comprises a target block having a first resolution, obtains a differential block having the first resolution and transforms the differential block into a differential block having a second resolution in order to generate the differential block having the second resolution;

a second transformation unit which, when the image comprises the target block having the first resolution, obtains a prediction block having the first resolution generated based on a pixel value of a reference block having the first resolution and transforms the prediction block into a prediction block having the second resolution in order to generate the prediction block having the second resolution; and a synthesis unit which, when the image comprises the target block having the first resolution, synthesizes the generated prediction block having the second resolution and the generated differential block having the second resolution in order to generate a target block having the second resolution.

21. The image processing apparatus of claim 14, wherein the reconstruction unit comprises:

a motion vector transformation unit which, when the image comprises a target block having a first resolution, transforms a magnitude of a motion vector of a target block having the first resolution at a predetermined ratio in order to generate a transformed motion vector;

a second transformation unit which, when the image comprises the target block having the first resolution, generates a prediction block having a second resolution based on a pixel value of a reference block having the second resolution indicated by the transformed motion vector;

a first transformation unit which, when the image comprises the target block having the first resolution, transforms a resolution of a differential block having the first resolution in order to generate a differential block having the second resolution; and a synthesis unit which, when the image comprises the target block having the first resolution, synthesizes the generated prediction block having the second resolution and the generated differential block having the second resolution in order to generate a target block having the second resolution.

* * * * *